Figure 12:
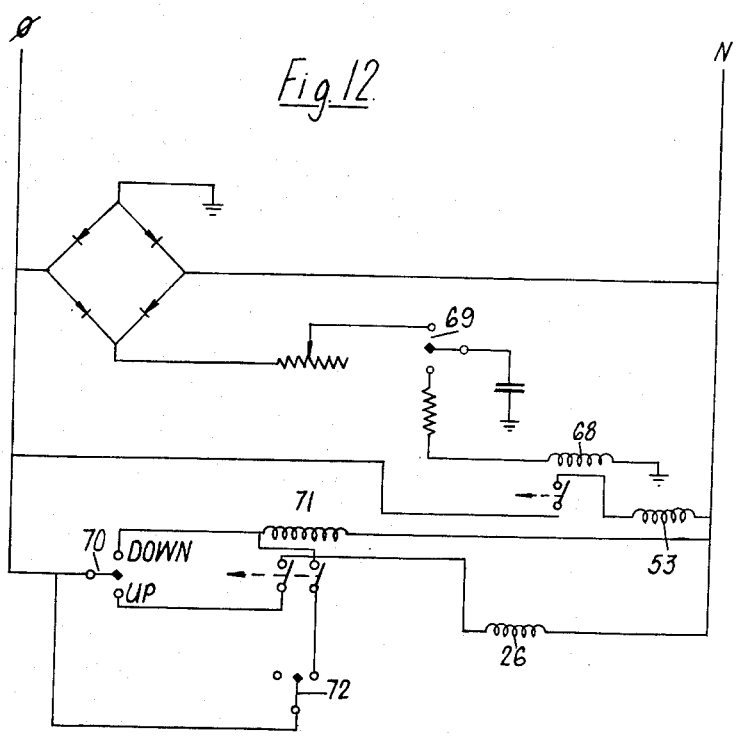

June 29, 1965 W. J. COWIE 3,191,507
APPARATUS FOR APPLYING A TEAR STRIP TO PLASTIC TUBING
Filed Nov. 26, 1962 4 Sheets-Sheet 1
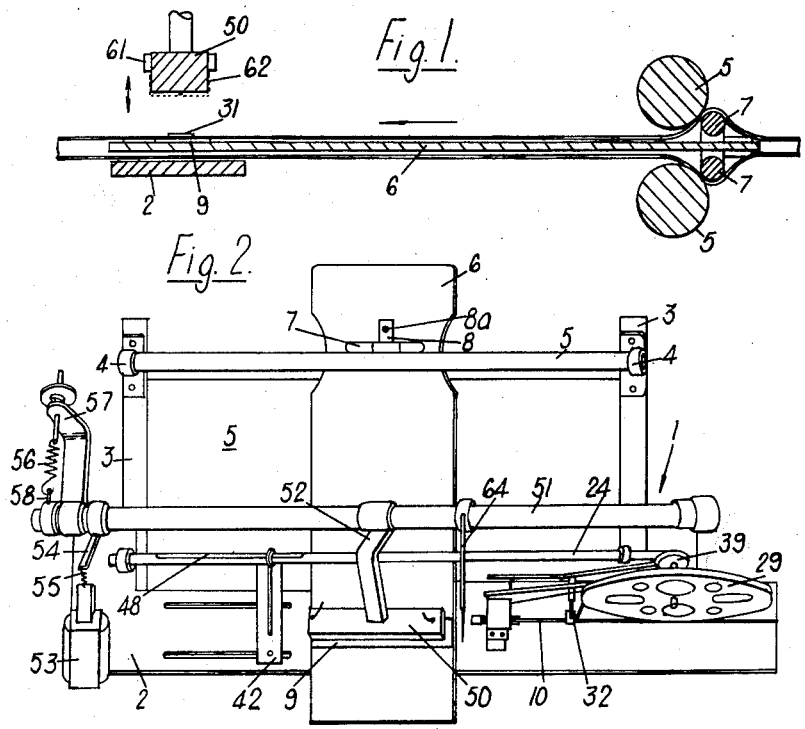
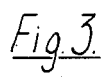
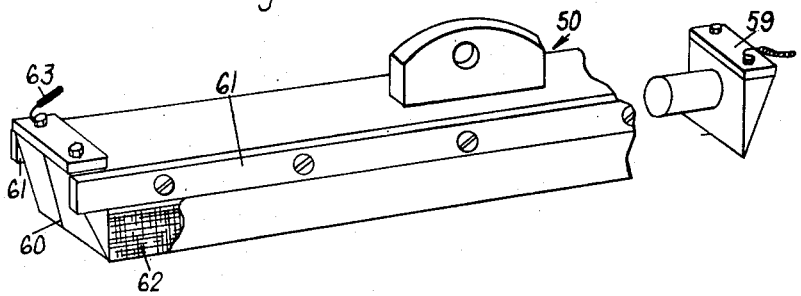

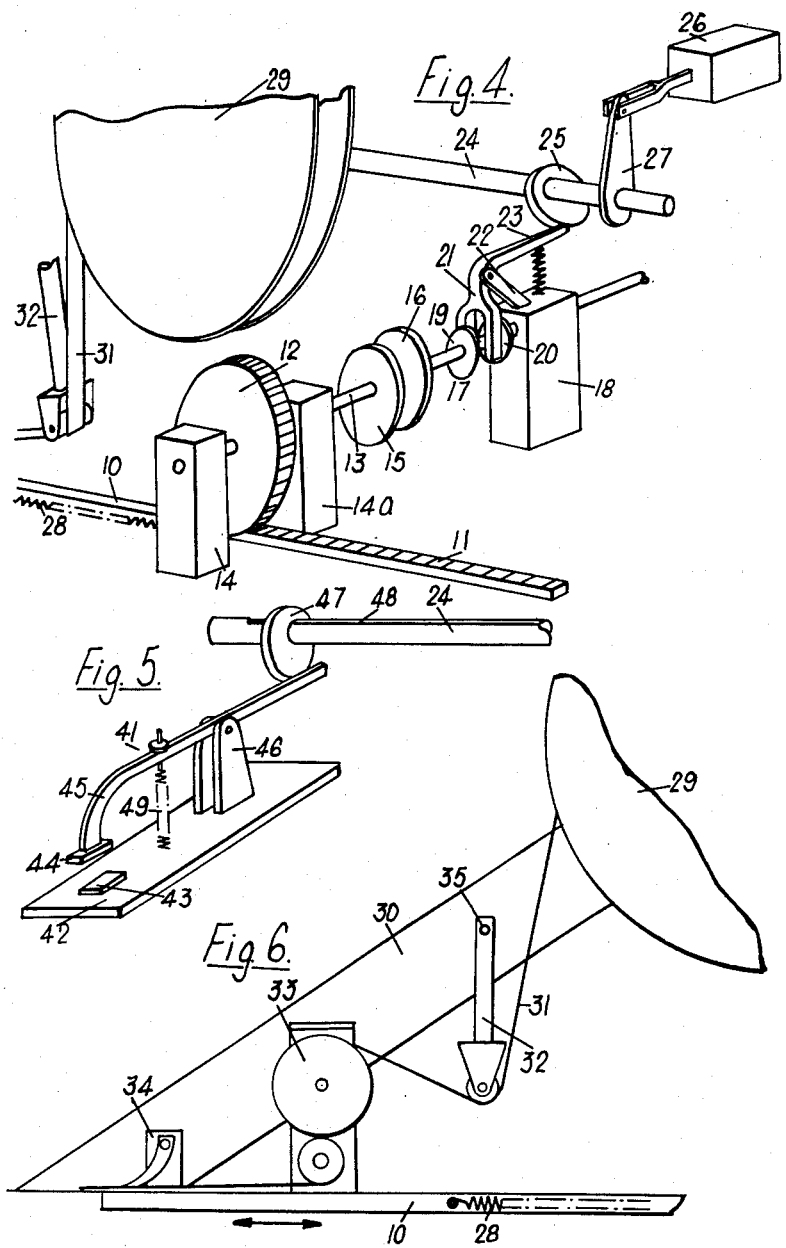

June 29, 1965  W. J. COWIE  3,191,507
APPARATUS FOR APPLYING A TEAR STRIP TO PLASTIC TUBING
Filed Nov. 26, 1962  4 Sheets-Sheet 3
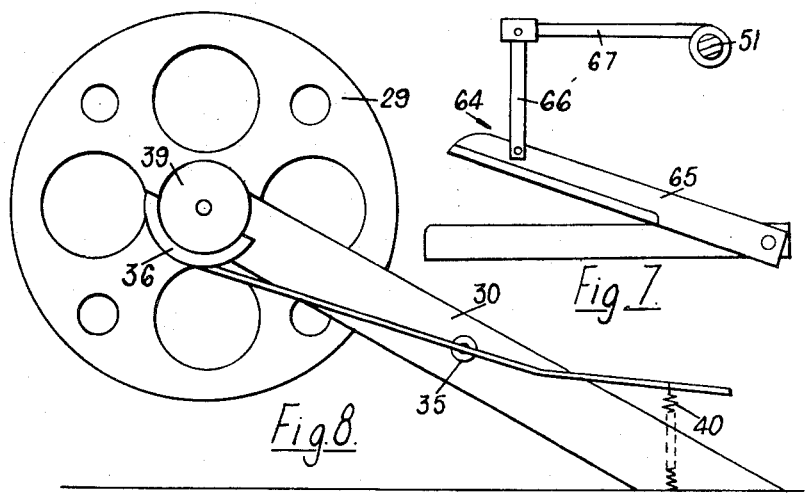
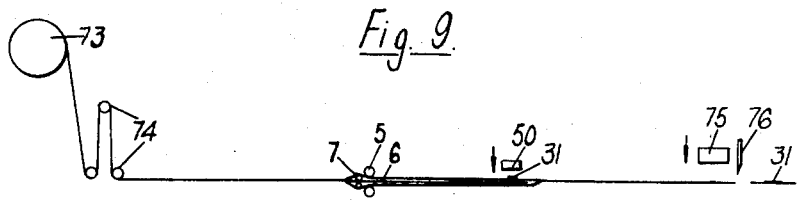
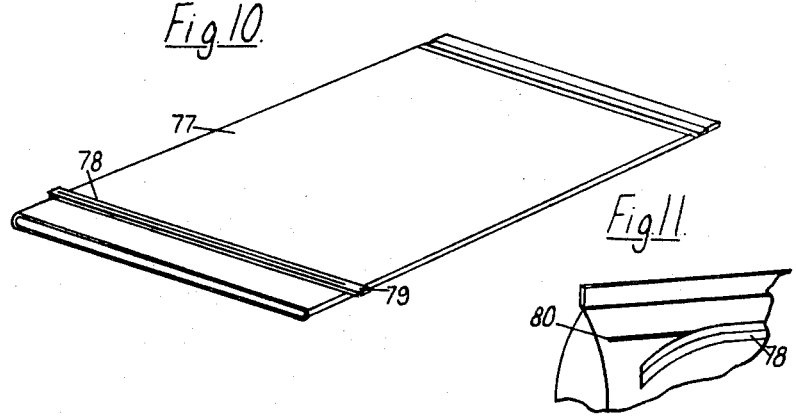

June 29, 1965    W. J. COWIE    3,191,507
APPARATUS FOR APPLYING A TEAR STRIP TO PLASTIC TUBING
Filed Nov. 26, 1962    4 Sheets-Sheet 4

United States Patent Office 3,191,507
Patented June 29, 1965

3,191,507
APPARATUS FOR APPLYING A TEAR STRIP
TO PLASTIC TUBING
William John Cowie, Palmerston North, Wellington, New
Zealand, assignor to Transparent Packaging Limited,
Palmerston North, Wellington, New Zealand, a corporation of New Zealand
Filed Nov. 26, 1962, Ser. No. 240,112
Claims priority, application New Zealand, Dec. 5, 1961,
130,878
8 Claims. (Cl. 93—1)

This invention relates to longitudinally seamless plastic bags and/or seamless tubing therefor and/or methods of and/or apparatus for making same.

At present a considerable amount of packaging is effected in bags of plastic material, the raw material being a tubular length of suitable plastic material, one end of which is heat sealed before filling and the second end being heat sealed after filling. There is a disadvantage in such bags, however, in that it is quite difficult to open such bags without the use of scissors since the material is difficult to tear and the seal is also quite effective and quite difficult to tear. If the seal is made slightly less effective then adequate sealing cannot always be guaranteed.

It is therefore an object of the present invention to provide longitudinally seamless plastic bags and/or seamless tubing therefor and/or methods of and/or apparatus for making same which bags are, after sealing, readily openable by the user yet which maintain an effective seal. Accordingly in one aspect, the invention consists in a method of preparing seamless tubular plastic material for manufacture into bags having tear strips on part of the wall thereof, said method comprising the steps of maintaining a floating anvil plate in position within a length of seamless plastic tubing, arranging a strip of plastic material to provide a tear strip on said tubing in a manner such that said strip passes over said floating anvil plate with part of the wall of said plastic tubular material interposed between said floating anvil plate and said strip, operating a sealing means to descend on said strip and said part of the wall of said plastic tubing in a manner such that said tear strip is sealed thereto so that on each length of material adapted to make a bag there is a free end of said tear strip of a size such that it may be gripped between the finger and thumb at least and so that on said tear strip being pulled away from the material, tearing of the material results along the line of said tear strip.

In a further aspect the invention consists in apparatus for applying a tear strip to seamless tubular plastic material for manufacture into bags having a tear strip on part of the wall thereof, said apparatus comprising a floating anvil plate adapted to be disposed within a length of seamles tubular plastic material, positioning means adapted to maintain said floating anvil plate in a relatively stable position, strip supplying means adapted to provide a tear strip over part of said plastic tubular material adjacent said floating anvil plate and sealing means adapted to seal said tear strip on to said plastic tubing by coaction between said sealing means and said floating anvil plate in a manner such that on each length of material adapted to make a bag there is a free end of said tear strip of a size such that it may be gripped between a finger and thumb at least so that on said tear strip being pulled away from the material in use, tearing of the material results along the line of said tear strip.

In a yet further aspect the invention consists in a longitudinally seamless plastic bag having a tear strip of plastic material heat sealed to part of the wall of said bag.

One preferred form of the invention will now be described with reference to the accompanying drawings in which:

FIGURE 1 is a diagrammatic elevation showing apparatus for attaching a tear strip to seamless plastic tubing, FIGURE 2 is a top perspective view of apparatus according to the present invention, FIGURE 3 is a detailed view of the sealing head, FIGURE 4 is a partly diagrammatic pictorial view of the driving means used to operate the shuttle arm adapted to feed the tear strip, FIGURE 5 is a detailed view of the strip retaining clamp adapted to hold the end of the tear strip when positioned across the plastic tubing, FIGURE 6 is a diagrammatic elevation showing the feed of the tear strip to the shuttle arm, FIGURE 7 is a more detailed elevation of the cutting means used for cutting the tear strip, FIGURE 8 is a partly diagrammatic view of the breaking means arranged to prevent the supply reel from overrunning in use, FIGURE 9 is a diagrammatic representation of a plastic bag making machine having apparatus for attaching tear strips incorporated therewith, FIGURE 10 is a pictorial view of a plastic bag formed having a tear strip attached thereto, FIGURE 11 is a detailed view illustrating how a completed and full bag is opened by removing the tear strip and FIGURE 12 is an electrical diagram representing the control circuit of the apparatus for applying the tear strip.

In the preferred form of the invention a machine for forming plastic bags from a roll or lay-flat polythene tubing is modified according to the present invention so that a tear strip may be provided at appropriate intervals along the plastic tubing. Of course, as will be realized, while it is more convenient in most cases to provide the unit adapted to provide the tear strip on the tubing in association with a bag forming machine it would be possible to embody this apparatus in a separate machine of its own right.

Various types of plastic bag making machines are at present known but generally it may be said that the apparatus according to the present invention will need to be fitted in a position before the plastic tubing is sealed and cut into lengths to form plastic bags.

The apparatus according to the present invention comprises a frame 1 having a transverse member 2 with two rearwardly extending arms 3 positioned adjacent each end thereof. This frame is adapted to fit the table top or main frame of a plastic bag forming machine. Adjacent the rearward end of the arms 3, bearing blocks 4 are mounted on either side thereof. Two holding rollers 5 extend between the bearing blocks 4 on either side of the arms 3 with approximately an eighth of an inch clearance provided between these rollers so that in use they are transverse to the longitudinal axis of the plastic tubing being formed into bags.

A floating anvil plate 6 is provided to extend from in advance of the rollers 5 to a position above and preferably beyond the member 2 so that the member 2 provides a back-up plate for the sealing head as will be further described later. This floating anvil plate 6 may be formed from any suitable material, for example, an eighth inch aluminum plate. Protruding means formed preferably as protruding rollers 7 are positioned to extend from the upper and lower surface of the plate 6. The protruding rollers 7 are each carried by a carrier 8 mounted on a common pivot 8a running through the floating anvil plate 6 approximately three inches from the leading edge thereof. The rollers 7 are disposed rearwardly that in use they will engage with the rollers 5 but because they are pivotally mounted any driving action between the engaged rollers in use is obviated or minimized so that the plate 6 will not tend to move away from the normal tracking path of the plastic tubing being processed. Also, in this respect, the rollers 7 are preferably of a low friction type for example ball-bearing rollers. The anvil plate 6 is waisted adjacent the rollers to allow the plastic tubing to be deformed while passing thereover as will be further described later.

Thus it will be seen that the fixed or holding rollers 5 when used in association with the pivotal or protruding rollers 7 extending from the floating anvil plate 6 provide a positioning means adapted to maintain the floating anvil plate in a relatively stable position while also allowing tubular plastic material to pass thereover.

A sealing pad 9 is provided transversely across the floating plate 6 immediately below the sealing means which will be further described later. This sealing pad 9 is formed for example from silicone rubber and is positioned so that it is above the transverse member providing the backup or supporting member on the side remote from the sealing head.

Of course as will be realized various sizes of plastic bags are formed from different widths of tubular plastic material and the floating anvil plates will be varied according to the particular width of tubing being processed in the machine.

Strip supplying means adapted to provide a plastic tear strip over part of the plastic tubular material above the floating anvil plate and over the sealing pad are constructed as follows. A shuttle arm 10 adapted to be moved by a rack 11 adjacent the rearward end thereof is arranged to move transversely over the plastic tubing beneath the sealing head. The rack 11 is driven by a gear wheel 12 mounted on a shaft 13 supported in suitable bearing blocks 14 and 14a. On the end of the shaft 13 protruding beyond the end of the bearing block 14a is mounted a clutch plate 15 which in use is engageable with a further clutch plate 16 mounted on the end of an axially aligned shaft 17 supported in a further bearing block 18. The shaft 17 may be driven by any suitable drive means for example an electric motor (not shown) in the accompanying drawings. Collars 19 and 20 are provided on the shaft 17 between the bearing block and the clutch plate 16. A yoke 21 engages between the collars 19 and 20 and such yoke is pivotally supported by arms 22 so that when an operating lever 23 integrally formed with the yoke 21 and extending rearwardly at right angles thereto is moved, the yoke coacts with one or other of the collars 19 or 20 thereby engaging or disengaging the clutch plates 15 and 16.

A transverse shaft 24 has a cam 25 positioned thereon. In use, when the shaft 24 is partially rotated, the cam 25 depresses the lever 23 and thereby causes the clutch plates to be engaged. The shaft 24 is partially rotated by a solenoid 26 moving an arm 27 attached thereto.

The shuttle arm 10 is biased to the retracted position by a spring 28 and in use is driven against the action of this biasing spring by the gear wheel 12 engaged with the rack 11.

A supply reel 29 adapted to hold a supply of plastic tear strip is positioned above the shuttle arm 10 and is mounted on a suitable supporting arm 30. By the term tear strip used herein I mean a relatively narrow strip of plastic material, preferably of material similar to that used for the plastic tubing. This tear strip is attached to part of the wall of the plastic tubing so that when it is removed a slot or tear is formed therein. The plastic tear strip 31 is fed from the reel 29 about a brake control lever 32 through distributing rollers 33 to gripping head 34 of the shuttle arm 10. This head 34 has a ratchet like action so that the tear strip may readily move forwardly in relation to the shuttle arm 10 but rearward movement in relation to the shuttle arm 10 is obviated or minimized.

The tear strip 31 is fed from the supply reel 29 about the brake control arm 32. This causes shaft 35 to be rotated thereby releasing a brake shoe 36 from a suitable brake drum 39 provided on the shaft mounting the reel 29. (See FIGURE 8). The brake shoe is biased to engage with the brake drum 39 by a spring 40. In use, when the shuttle arm moves transversely across plastic tubing feeding the tear strip 31 from the reel 29, the force about the lever 32 tends to release the brake shoe 36 but immediately forward movement is ceased. The spring 40 again biases the brake shoe to coact with the brake drum 39 thereby obviating or minimizing any tendency for the reel 29 to overrun.

A tear strip retaining clamp is positioned on the side of the plastic tubing remote from the supply reel 29 and is adapted to grip the end of the tear strip prior to the shuttle arm 10 being retracted leaving the tear strip in position ready for sealing. Because of the varying sizes of plastic tubing which may be processed, it is necessary to provide retaining clamp 41 so that it may be easily adjusted. To this end, an adjustment base plate 42 is provided and is adapted for example to move in longitudinal slots in the transverse member 2. A bottom gripping jaw 43 is mounted on this plate 42 and a top adjustable gripping jaw 44 is mounted on a movable lever 45 pivotally supported between stands 46 positioned towards the rear of the plate 42. The lever extends rearwardly from the stands and is adapted to be engaged with a cam 47 also attached to the shaft 24. A key-way 48 is provided to allow the cam to be adjusted in correspondence with the strip retaining clamp 41. If desired, some form of positive connection may be provided so that by adjusting the retaining clamp 41, the cam 47 is also automatically correctly adjusted. A spring 49 is provided to bias the jaws 43 and 44 to the closed position.

Sealing means is provided and adapted to seal the tear strip 31 onto the plastic tubing by coaction between the sealing means and the floating anvil plate. The sealing means comprises a sealing head 50 adapted to heat seal the plastic tear strip in position, a transverse shaft 51 rotatably mounted and adapted to extend across the floating anvil plate 6 and a carrying arm 52 joining the sealing head 50 to the shaft 51. Thus the sealing head 50 is fixed in relation to the shaft 51, so that it moves upon the shaft being partially rotated. This partial rotation is effected by a solenoid 53 adapted to operate a lever 54 attached to the shaft 51. A spring connection 55 is used between the lever 54 and the solenoid 53 to provide a dampening action so that the sealing head is not depressed too rapidly upon operation of the solenoid action. Also the spring connection 55 allows the solenoid 53 to fully close while preserving flexibility in the positioning of the sealing head 50. The shaft 51 is biased with the sealing head 50 in the raised position by a spring 56 extending between a bracket 57 and a lever 58 (see FIGURE 2).

The sealing head 50 is illustrated in more detail in FIGURE 3 and includes tensioning holders 59 positioned at either end with a Nichrome wire 60 extending about the tensioning holders and along the bottom of the sealing head. The tensioning holders 59 are each biased outwardly to accommodate for any expansion of the Nichrome wire during heating. Clamping bars 61 are provided along the sides of the sealing head 50 to hold Teflon cloth 62 (shown in part only) positioned around the sealing head and over the Nichrome wire to prevent the plastic tear strip from adhering to the Nichrome wire during use. Suitable electrical leads 63 are provided for the sealing head in the normal manner.

As will be apparent the sealing heads will also preferably require to be changed for various widths of plastic tubing. However in all cases it is necessary to have the sealing head with lesser effective sealing length than the plastic tear strip being attached so that in use a free end or gripping means of a size such as may be gripped between the finger and thumb at least is provided for each length of plastic tubing adapted to make a bag.

The sealing head 50 in use heat seals the plastic tear strip to one wall of the plastic tubing so that on the tear strip being pulled away from plastic material which will then have preferably been formed into plastic bags, tearing of the plastic material results along the line of the tear strip. The Nichrome wire used provides a substantially linear seal and the tear or slot is formed along this line.

Cutting means 64 is provided to cut the required length of plastic tear strip to be attached to the plastic tubing by a guillotine positioned between the sealing head and the end of the shuttle arm when in the retracted position with the cutter being adapted to cut the tear strip adjacent the side of the plastic tubing in use but still of a length sufficient to leave a gripping end after the tear strip has been attached by heat sealing. The cutter 64 is shown in more detail on FIGURE 7 with cutting blade 65 operable upon the partial rotation of the shaft 51 by connecting levers 66 and 67 so that when the sealing head 50 is depressed the cutting blade 65 is also lowered cutting the tear strip ready for the next sequence of operations.

The electrical circuit showing the control of the above described apparatus is illustrated in FIGURE 12. A suitable actuating relay 68 is operated through a micro-switch 69 at the commencement of the sealing cycle of a plastic bag making machine. The operation of relay 68 energizes solenoid 53 thereby lowering the sealing head 50 and the cutting means 64 with the relay 68 being slugged sufficiently to hold the solenoid 53 in for the correct sealing time.

As the sealing head 50 is raised or lowered it causes two-way micro-switch 70 to be operated. A relay 71 is arranged to be actuated upon operation of the micro-switch 70 so as to energize solenoid 26 which in turn operates both the strip retaining clamp and the driving means for the shuttle arm. A further micro-switch 72 normally in the closed position is provided adapted to be opened when the shuttle arm reaches its fully extend position.

As was originally stated, the above described apparatus may be attached or associated with known plastic bag forming machines. Thus for example the apparatus may be associated with an intermittent feed plastic bag forming machine as diagrammatically illustrated in FIGURE 9 of the accompanying drawings. A supply roll 73 of lay-flat plastic tubing is fed round a number of guiding rollers 74 and is passed over the floating anvil plate 6 retained in position by the rollers 5 and 7 as was above described. The sealing head 50 is operable to seal the tear strip 31 on part of the wall of the plastic tubing also as was above described and a further sealing head 75 is operable to seal the plastic tubing at intervals in the normal manner. A guillotine means 76 is provided to cut the sealed plastic tubing into completed plastic bags ready to be filled in the normal manner.

A longitudinally seamless plastic bag 77 according to the present invention is illustrated in FIGURE 10. Thus it will be seen a tear strip 78 is attached to one side of the plastic bag which may then be filled and heat sealed in the normal manner. A gripping end 79 is provided at least to one side of the bag to enable the tear strip 78 to be gripped in use when it is desired to open the bag. Part of a filled bag being opened is illustrated in FIGURE 11 where the tear strip 78 is shown in the partially removed position. When the tear strip is removed it causes a slit 80 to be formed in the wall of the plastic bag and thereby an easy and neat means of opening a filled bag.

The use of the above described invention will be relatively apparent from the foregoing. Briefly in summary it may be said the floating anvil plate 6 is initially placed in the plastic tubing and then maintained in a relatively stable position by the protruding rollers 7 engaging with the holding rollers 5 while still allowing the plastic tubing to freely pass thereover. This attachment is fitted to a normal bag forming machine which intermittently feeds the plastic tubing forwardly to be sealed into individual bags. For convenience, I will commence the sequence of operations just prior to the sealing head 50 being depressed to heat seal a positioned plastic tear strip to the plastic tubing. The micro-switch 69 causes the relay 68 to be operated thereby energizing the solenoid 53. This revolves the shaft 51 depressing the sealing head 50 for the required period to seal the plastic tear strip to the plastic tubing. At the same time the cutting means 64 is operated severing the attached length of tear strip from the shuttle arm 10. When the sealing head 50 is depressed, the micro-switch 70 moves to the down position energizing the coil of relay 71. This relay is suitably slugged or delayed in action to allow for the sealing period. As the coil of relay 71 is energized, the relay contacts are closed and as switch 72 is normally in the closed position, the relay is held in even after movement of the sealing head opens the "down" contacts. When the sealing head moves to the raised position, the two-way micro-switch 70 closes the "up" contacts and energizes the solenoid 26 through a set of the contacts of relay 71. This operates both the drive to the shuttle arm and the strip retaining clamp as is illustrated particularly in FIGURES 4 and 5 of the accompanying drawings.

The shuttle arm 10 is driven transversely across the floating anvil plate 6 beneath the sealing head carrying with it the tear strip 31. At the same time the plastic tubing may be fed forwardly for a predetermined distance dependent upon the size of the plastic bag being formed. When the shuttle arm 10 is in the fully extended position, the end of the tear strip 31 is placed between the jaws 43 and 44 of the strip retaining clamp 41. At this position, micro-switch 72 is opened by the movement of the shuttle arm 10 thereby de-energizing the relay 71 and hence the solenoid 26. This allows the strip retaining clamp to operate clamping the end of the tear strip 31 between the jaws 44 and 43. Also the shuttle arm 10 is moved to the retracted position under the action of the biasing spring 28. This leaves the tear strip positioned across the plastic tubing ready to be heat sealed at the commencement to a similar cycle to that above described.

What I claim is:

1. Apparatus for applying a tear strip to seamless tubular plastic material for manufacture into bags having a tear strip on part of the wall thereof, said apparatus comprising a floating anvil plate, two protruding rollers positioned to extend from the upper and lower surfaces of the anvil plate, a carrier for each protruding roller, a common pivot extending through the anvil plate on which the carriers are mounted, said plate and protruding rollers being adapted to be disposed within a length of seamless plastic material, a pair of transverse holding rollers spaced apart to provide a gap therebetween, the gap defined by the bounding surfaces of said holding rollers being sufficient to allow the anvil plate and the tubular plastic material thereover to pass therebetween, but with further longitudinal movement of said floating anvil plate being restrained by engagement of said protruding rollers with said holding rollers, strip supplying means for providing a tear strip over part of said plastic tubular material adjacent said anvil plate, and sealing means for sealing said tear strip to said plastic tubing cooperable with said floating anvil plate for providing on each bag length of material a free end for said tear strip of a size that may be gripped between at least a finger and thumb for pulling the tear strip from said plastic material in use with the tearing of the material being along the line of said tear strip.

2. The apparatus as claimed in claim 1, in which the sides of said anvil plate are cut-away adjacent the protruding rollers for allowing the deformation of the tubing as the tubing passes over said protruding rollers while still permitting the remaining portion of said anvil plate to fit neatly within said plastic tubing.

3. The apparatus as claimed in claim 2, in which a sealing pad of silicone rubber is mounted transversely on the upper surface of said floating anvil plate so that in use said pad is positioned immediately below said sealing means.

4. Apparatus for applying a tear strip to seamless tubular plastic material for manufacture into bags having a tear strip on part of the wall thereof, said apparatus comprising a floating anvil plate adapted to be disposed within a length of seamless tubular plastic material, positioning means adapted to maintain said floating anvil plate in a relatively stable position, a sealing head, a strip supply reel holding a supply of plastic tear strip mounted on one side of said plastic tubing, a shuttle arm for reciprocatory movement transversely over said plastic tubing beneath said sealing head, a strip retaining clamp on the side of said plastic tubing remote from said supply reel operable upon said shuttle arm being moved transversely across said plastic tubing to engage and clamp the end of said tear strip, ratchet means associated with said shuttle arm for allowing said shuttle arm to be withdrawn to a retracted position leaving said tear strip held by said retaining clamp and positioned transversely across said plastic material ready for heat sealing, and a heat sealing means adapted to seal said tear strip onto said plastic tubing by co-action between said sealing means and said floating anvil plate for providing on each bag length of material a free end for said tear strip of a size that may be gripped at least between a finger and thumb for pulling the tear strip from the material in use with the tearing of said plastic material being along the side of said tear strip.

5. The apparatus as claimed in claim 4, in which drive means is provided for moving said shuttle arm transversely across said plastic tubing, said drive means including a rack for the shuttle arm, a pinion meshing with said rack, clutch means operably associated with said pinion for intermittently rotating the pinion, and spring means operably connected to the shuttle arm operative when the clutch means disengages the drive to said pinion for biasing said shuttle arm to the retracted position.

6. Apparatus for applying a tear strip to seamless tubular plastic material for manufacture into bags having a tear strip on part of the wall thereof, said apparatus comprising a floating anvil plate, two protruding rollers positioned to extend from the upper and lower surfaces of the anvil plate, a carrier for each protruding roller, a common pivot extending through the anvil plate on which the carriers are mounted, said plate and rollers being adapted to be disposed within a length of seamless plastic material, a pair of transverse holding rollers spaced apart to provide a gap therebetween, the gap defined by the bounding surfaces of the holding rollers being sufficient to allow the anvil plate and tubular plastic material thereover to pass therebetween, but with further longitudinal movement of the floating anvil plate being restrained by engagement of said protruding rollers with the holding rollers, strip supplying means for providing a tear strip over part of said plastic tubular material adjacent said floating anvil plate, a heat sealing head, a carrying arm supporting said heat sealing head, a shaft on which said carrying arm is mounted, means for imparting partial rotation to said shaft whereby said carrying arm and head are lowered so that said head engages said tear strip on said plastic tubing and heat seals part of said strip to said tubular material while leaving a free end portion of a size that may be gripped for pulling the tear strip from the material in use with the tearing of the plastic material being along the line of the tear strip, and means for raising the carrying arm and sealing head away from the plastic tubing.

7. The apparatus as claimed in claim 6, in which said raising means includes a bracket and spring means connected to the bracket and to said shaft.

8. Apparatus as claimed in claim 6, in which said sealing head includes a resistance wire beneath said head, biasing means positioned at each end thereof to tension said resistance wire, terminals for permitting said resistance wire to be electrically energized, a protective covering extending over said resistance wire, and holding bars positioned on each side of said head for holding said protective covering with said covering at least minimizing the propensity of said plastic strip to adhere to said resistance wire in use.

References Cited by the Examiner

UNITED STATES PATENTS

| Number | Date | Name | Class |
|---|---|---|---|
| 123,812 | 2/72 | Crowell | 93—26 |
| 2,008,361 | 7/35 | Lindsey | 229—51 |
| 2,334,381 | 11/43 | Bronander | 93—1 |
| 2,554,160 | 5/51 | Gunten. | |
| 2,574,094 | 11/51 | Fener et al. | |
| 2,726,706 | 12/55 | Hakomaki. | |
| 2,739,512 | 3/56 | Conti | 93—1 |
| 2,942,528 | 6/60 | Ouellette. | |
| 2,952,395 | 9/60 | Spees | 229—51 |
| 3,069,303 | 12/62 | Scholle | 93—8 |
| 3,090,285 | 5/63 | Carlson. | |
| 3,098,601 | 7/63 | Anderson et al. | |

FRANK E. BAILEY, *Primary Examiner.*

FRANKLIN T. GARRETT, BERNARD STICKNEY, *Examiners.*